United States Patent

Hayes et al.

Patent Number: 6,073,212
Date of Patent: Jun. 6, 2000

[54] REDUCING BANDWIDTH AND AREAS NEEDED FOR NON-INCLUSIVE MEMORY HIERARCHY BY USING DUAL TAGS

[75] Inventors: Norman M. Hayes; Belliappa M. Kuttanna, both of Sunnyvale; Krishna M. Thatipelli, Fremont; Ricky C. Hetherington, Pleasanton; Fong Pong, Mountain View, all of Calif.

[73] Assignee: Sun Microsystems, Inc., Palo Alto, Calif.

[21] Appl. No.: 08/940,217

[22] Filed: Sep. 30, 1997

[51] Int. Cl.[7] .................................................. G06F 12/00
[52] U.S. Cl. .......................................... 711/122; 711/146
[58] Field of Search ..................................... 711/122, 146

[56] References Cited

U.S. PATENT DOCUMENTS

| | | | |
|---|---|---|---|
| 5,155,828 | 10/1992 | LaFetra et al. | 711/122 |
| 5,155,832 | 10/1992 | Hunt | 711/120 |
| 5,303,362 | 4/1994 | Butts, Jr. et al. | 711/121 |
| 5,369,753 | 11/1994 | Tipley | 711/122 |
| 5,386,547 | 1/1995 | Jouppi | 711/122 |
| 5,398,325 | 3/1995 | Chang et al. | 711/3 |
| 5,432,918 | 7/1995 | Stamm | 711/156 |
| 5,524,233 | 6/1996 | Milburn et al. | 711/141 |
| 5,542,062 | 7/1996 | Taylor et al. | 711/3 |
| 5,564,035 | 10/1996 | Lai | 711/144 |
| 5,577,227 | 11/1996 | Finnell et al. | 711/122 |
| 5,581,725 | 12/1996 | Nakayama | 711/122 |
| 5,603,004 | 2/1997 | Kurpanek et al. | 711/118 |
| 5,651,135 | 7/1997 | Hatakeyama | 711/128 |
| 5,671,231 | 9/1997 | Cooper | 714/724 |
| 5,696,936 | 12/1997 | Church et al. | 711/138 |
| 5,717,890 | 2/1998 | Ichida et al. | 711/122 |
| 5,943,686 | 8/1999 | Arimilli et al. | 711/146 |

FOREIGN PATENT DOCUMENTS 0 481 233   4/1992   European Pat. Off.   ........ G06F 12/08

OTHER PUBLICATIONS

Handy, Jim; The Cache Memory Book; Academic Press, Inc., 1993; pp. 132–133.

Afek, et al., "A Lazy Cache Algorithm," Association for Computing Machinery, 0–89791–323–X, 1989, pp. 209–223.

Brown, G., "Asynchronous multicaches," Distributed Computing, vol. 4, pp. 31–36; 1990.

IBM Technical Disclosure Bullentin, Jan. 1998, vol. 30, No. 8, p. 33.

Primary Examiner—David L. Robertson
Attorney, Agent, or Firm—D'Alessandro & Ritchie

[57] ABSTRACT

An apparatus and method for optimizing a non-inclusive hierarchical cache memory system that includes a first and second cache for storing information. The first and second cache are arranged in an hierarchical manner such as a level two and level three cache in a cache system having three levels of cache. The level two and level three cache hold information non-inclusively, while a dual directory holds tags and states that are duplicates of the tags and states held for the level two cache. All snoop requests (snoops) are passed to the dual directory by a snoop queue. The dual directory is used to determine whether a snoop request sent by snoop queue is relevant to the contents of level two cache, avoiding the need to send the snoop request to level two cache if there is a "miss" in the dual directory. This increases the available cache bandwidth that can be made available by second cache since the number of snoops appropriating the cache bandwidth of second cache are reduced by the filtering effect of dual directory. Also, the third cache is limited to holding read-only information and receiving write-invalidation snoop requests. Only snoops relating to write-invalidation requests are passed to a directory holding tags and state information corresponding to the third cache. Limiting snoop requests to write invalidation requests minimizes snoop requests to third cache, increasing the amount of cache memory bandwidth available for servicing catch fetches from third cache. In the event that a cache hit occurs in third cache, the information found in third cache must be transferred to second cache before a modification can be made to that information.

24 Claims, 3 Drawing Sheets

REDUCING BANDWIDTH AND AREAS NEEDED FOR NON-INCLUSIVE MEMORY HIERARCHY BY USING DUAL TAGS

BACKGROUND OF THE INVENTION

1. Field of the Invention

The present invention relates to cache memory systems. More particularly, the present invention relates to non-inclusive hierarchical cache memory systems.

2. Background

Multi-processing computer systems that pair a hierarchical, inclusive cache unit for each processor are known. A typically configuration of one such multi-processing system is shown in FIG. 1 which includes processors 10-1 through 10-n, cache units 12-1 through 12-n, main memory 13, and a snoop request bus 14. Such a multi-processing approach however does not fully maximize the potential instruction execution bandwidth that can be achieved by using multiple processors for at least two reasons: the use of the inclusion method in a hierarchical cache; and the need to maintain cache coherency among the cache units used.

Inclusion is a method where each lower level cache contains data or instructions ("information") which is a superset of the information held by all the upper levels of cache in the cache hierarchy. The inclusion method imposes the following disadvantages which are compounded when the method is replicated in each cache unit in a multi-processor computer system. First, a large amount of silicon area is required because three bits are required to encode a state for each cache line used under the MOESI protocol which is described by Paul Sweazey and Alan Jay Smith in *A Class of Compatible Cache Consistency Protocols and their Support by the IEEE futurebus*, IEEE, 1996, hereby incorporated by reference.

Second, maintaining inclusion incurs a large bandwidth or performance penalty that increases in proportion to the number of inclusive caches used in a cache unit because every cache line evicted from a lower level cache requires all the subblocks within the lower level cache to be evicted from the upper level blocks. As defined in *High Performance Memories*, by Betty Prince, available from John Wiley & Sons, and is incorporated herein by reference, a cache line consists of an address and the data corresponding to that address. A cache line, which may also be referred to as a cache block, is the minimum unit of information that can be moved between main memory and cache.

For example, in an inclusive hierarchical cache unit having three levels of cache such as a level one cache, a level two cache, and a level three cache, evicting a level three cache line requires all the subblocks within the level three cache to be evicted from the level two cache and the level once cache. If every level three cache line has a size of 512 bytes, every level two cache line would have a level two cache line size of 128 bytes. Thus, there are four (4) subblocks of 128 bytes in each level three cache line which means that for each level three cache line evicted, four replacement requests are generated for the level two cache to remove any potential data copies stored in the level two cache.

This generation of four replacement requests for every cache line evicted is propagated further along the hierarchy if a level one cache is also constrained to the inclusive method. In the above example, each level one cache line would be 32 bytes which results in four subblocks in level two. Thus, following the result above, a single level three cache line replacement results in four replacement requests generated for the level two cache and 16 replacement requests generated for the level one cache. Thus, the inclusion method becomes very unwieldy very fast as more inclusive cache levels are used. The impact is that for a given cache unit size, with respect to the size of the individual levels of cache and the number of cache levels used, the inclusive method results in higher miss rates when compared with cache units that do not impose the inclusive method. Higher miss rates also result in higher potential write-back requests to main memory.

In addition to the above problem with inclusion, a multi-processor approach requires maintaining coherency between multiple copies of data held among cache units 12-1 through 12-n, if any. Maintaining coherency reduces the available memory bandwidth of the cache units because a portion of the available memory bandwidth is wasted servicing snoops that result from operations that involve the modification of a copy of data held in one cache unit.

Rather than using an inclusive hierarchical cache memory system, another approach uses a non-inclusive hierarchical cache but this also has drawbacks due to the amount of cache bandwidth that is expended in maintaining cache coherency between cache units.

Hardware-based solutions to maintaining coherence in a multiprocessor system include a centralized or distributed approach. In a centralized approach, directory protocols maintain information about where copies of information reside in a centralized directory. The directory contains information about the contents of local caches for the entire multi-processor system. A centralized controller keeps this information up to date and interacts with all of the local caches to ensure that data consistency is maintained.

In a distributed approach, "snoopy" protocols distribute the responsibility for maintaining cache coherence among all of the processors. The updates each processor makes to a shared memory block must be broadcast to all other processors. Each cache controller "snoops", or reads, these broadcast messages and updates its own cache accordingly.

In the "snoopy" system, each individual processor and its cache is connected to a shared system bus that is connected to the shared main memory. As data operations are performed in each processor, the processor will broadcast these operations onto the shared system bus. For example, as a first processor performs read and write operations on shared data copies located in its cache, it broadcasts this information to the system bus to alert other processors to update the status of their data copies. By "snooping" the system bus, a second processor knows that it must invalidate its copy of a piece of data after it receives the broadcast that the first processor has operated on that same piece of data. Other examples of the messages broadcast by processors onto the shared system bus are well known to those of ordinary skill in the art.

In the snoopy system, bandwidth may be wasted by servicing snoops arising from a write-invalidation sent by processor 10-1 after data in a cache line or block is modified in cache unit 12-1. The snoops are detected by processors 10-n and are serviced by checking each of their cache units, 12-n, for any existing copies of the data just modified in cache unit 12-1 and if existing, removed from cache units 12-n.

In addition, due to the high instruction and data bandwidth required by having multiple processors, cache line state and tag information for all levels of cache should be quickly accessible so that snoop requests may be serviced promptly, minimizing read and write latency to the level two and three caches. Such multi-processor systems benefit from having cache state and tag information on the same silicon real estate as the processor ("on-chip"). However, having state and tag information "on-chip" reduces silicon real estate that can be made available for processor circuitry, rendering the approach expensive when compared to off-chip designs.

Accordingly, it would be desirable to provide an apparatus and method for optimizing a non-inclusive cache so that the amount of cache memory bandwidth expended for snoop protocols and the on-chip area needed to implement the apparatus and method are minimized.

SUMMARY OF THE INVENTION

The present invention is an apparatus and method for optimizing a non-inclusive hierarchical cache memory system. The invention includes a first and second cache for storing information which are arranged in an hierarchical manner such as a level two and level three cache in a cache system having three levels of cache. The level two and level three cache hold information non-inclusively, while a dual directory holds tags and states that are duplicates of the tags and states held for the level two cache. All snoop requests (snoops) are passed to the dual directory by a snoop queue. Dual directory is used to determine whether a snoop request sent by snoop queue is relevant to the contents of level two cache, avoiding the need to send the snoop request to level two cache if there is a "miss" in the dual directory. This increases the available cache bandwidth that can be made available by second cache since the number of snoops appropriating the cache bandwidth of second cache are reduced by the filtering effect of dual directory.

Also, the third cache is limited to holding read-only information and receiving write-invalidation snoop requests. Only snoops relating to write-invalidation requests are passed to a directory holding tags and state information corresponding to the third cache. Limiting snoop requests to write invalidation requests minimizes snoop requests to third cache, increasing the amount of cache memory bandwidth available for servicing catch fetches from third cache. In the event that a cache hit occurs in third cache, the information found in third cache must be transferred to second cache before a modification can be made to that information.

DETAILED DESCRIPTION OF A PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors operating under program control, or special purpose processors adapted to particular process steps and data structures, and that implementation of the process steps and data structures described herein would not require undue experimentation or further invention.

System Architecture

Figure 1:
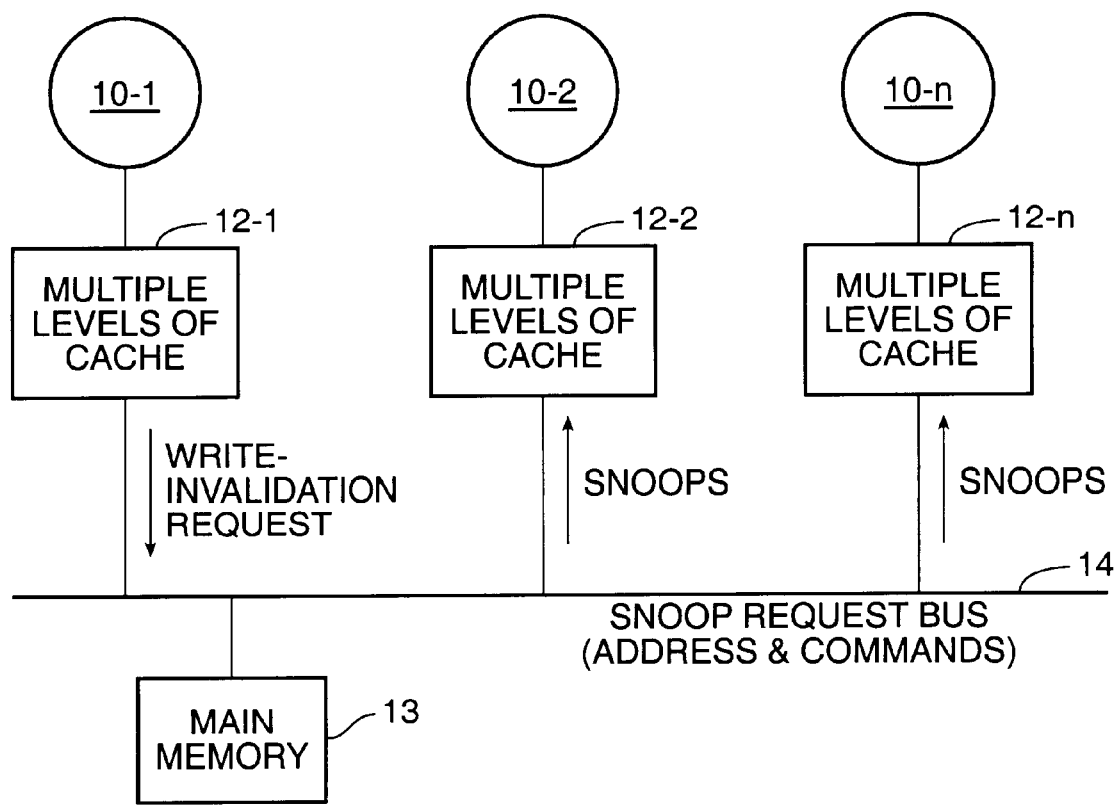
FIG. 1 shows a multi-processor computer system having inclusive hierarchical cache units.
Figure 2:
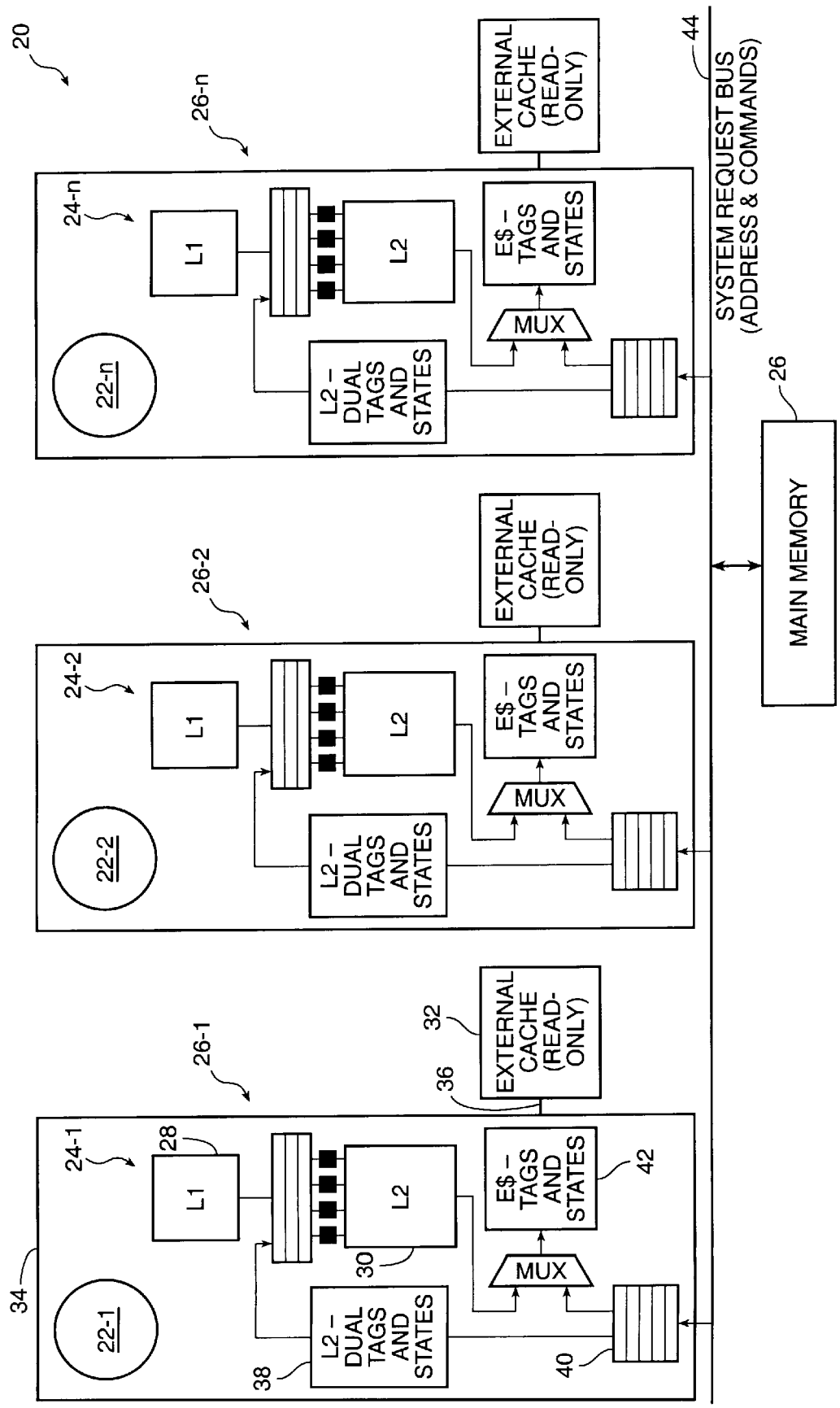
FIG. 2 shows a multiprocessor system having non-inclusive hierarchical cache units employing a snoop-based coherency protocol in accordance with a preferred embodiment of the present invention.

FIG. 2 shows a multiprocessor system having non-inclusive hierarchical cache units employing a snoop-based coherency protocol in accordance with a preferred embodiment of the present invention.

As shown in FIG. 2, a multiprocessor system 20 includes processors 22-1 through 22-n and cache units 24-1 through 24-n which are grouped together in processor/cache unit combinations 26-1 through 26-n. To avoid over-complicating the following discussion, processor/cache unit combination 26-2 through 26-n are intended to contain the same features as processor cache unit combination 24-1 and are thus not disclosed in detail but are intended to contain all of the novel features disclosed herewith. Each cache unit 24-1 through 24-n in processor/cache unit combination 26-1 through 26-n contains three levels of cache, first cache 28, second cache 30, and third cache 32 that are organized in hierarchical levels.

The hierarchy level defined for each cache is dependent on the speed and size of each cache. The fastest cache, which is typically the smallest in the cache unit, is at the top level of the hierarchy and is referred to as the level one cache, while the slowest cache, which is typically the largest cache in the cache unit is at the bottom of the hierarchy.

A level one cache is intended to hold information that is most likely to be used frequently by the processor. The lower cache levels, level two and/or level three, depending on the total number of caches a processor has, are generally slower than the level one cache, but are able to hold more information. Thus a processor will first look for the information it needs in the level one cache, then the level two cache, and then the level three cache. In multiprocessor systems, if the data is not found in any of the cache levels a cache miss will be broadcast to the system bus to locate the information either in another processor's cache or in the main memory.

The cache hierarchy is defined with second cache 30 being below first cache 28 and third cache 32 being below second cache 30. Because there are a total of three caches in cache unit 24, first cache 28, second cache 30, and third cache 32 are defined as level one, level two, and level three caches, respectively. First cache 28 and second cache 30 share the same silicon die 34 with processor 22-1 (on-chip), while third cache 32 remains part of cache unit 24-1 through an external cache bus 36 (off-chip). Third cache 32 is not only a level three cache but may be referred to as an external cache. On-chip caches tend to be smaller with faster access times, whereas off-chip caches tend to be larger with slower access times.

Level two cache and level three cache in cache unit 24-1 are non-inclusive with respect to each other, while level one cache may or may not be non-inclusive with respect to either level two cache and/or level three cache. In a non-inclusive cache hierarchy, the lower level of the cache memory hierarchy does not necessarily contain the information held within all upper levels of cache. This provides the advantage of minimizing the number of tags and states that must be provided for each lower level of cache as compared to each lower level of cache in an inclusive cache hierarchy. In an inclusive cache hierarchy, the lower level of the cache memory hierarchy is a superset of all of the upper levels. This results in the tags and states stored in cache directories of upper levels of cache to be also stored in every lower level of cache used. The redundancy in states and tags creates rising overhead costs with respect to the size of the lower level cache directories and the speed in which these directories may be searched for a cache hit as the size of the lower level caches or number of caches increase. The use of non-inclusive caches avoids the overhead costs just described.

Cache coherency is provided through a hardware solution using a snoop protocol. Snoops may be generated by processor/cache unit combination 26-1 or from another processor/cache unit combination 26-n provided in the multi-processor system. Snoops arising from another processor are sent through a system request bus 44. For each processor/cache unit combination used, a snoop is generated each time information in the cache unit is changed or invalidated. Moreover, the snoop must be serviced by the other processor/cache units to ensure that coherency is maintained. Consequently, snoop traffic within each cache unit increases as the number of cache units and processors (or equivalents) used in a multiprocessor computer system increases.

To minimize the number of snoop requests (snoops) received by second cache 30 and third cache 32 in cache unit 24-1, a dual directory 38 is provided to filter snoops directed to second cache 30. All snoops are passed to dual directory 38 by snoop queue 40. This increases the available cache bandwidth that can be made available by second cache 30 since the number of snoops appropriating the cache bandwidth of second cache 30 are reduced by the filtering effect of dual directory 38.

If inclusion is maintained between first cache 28 and second cache 30, snoops only need to be directed to second cache 30, resulting in dual directory 38 also minimizing the amount of snoop traffic appropriating the bandwidth of first cache 28. As would be evident to one of ordinary skill in the art, if second cache 30 does not maintain inclusion of first cache 28 information (each cache level are non-inclusive with respect to each other), snoops must also be sent to the first cache 28 because the snoops would not be filtered out by dual directory 38. All snoops are moved through the processor according to a FIFO scheme although this is not intended to limit the invention in anyway. If a strict FIFO constraint is used to process all snoops, later requests that could be quickly processed will be delayed by earlier requests that take more time to process.

Due to the high instruction and data bandwidth required by having multiple processors, cache line state and tag information for all levels of cache should be quickly accessible so that snoops may be serviced promptly, minimizing read and write latency to the caches such as the level two and level three caches. Such multi-processor systems benefit from having cache state and tag information on the same silicon real estate as the processor ("on-chip"). However, having state and tag information "on-chip" reduces silicon real estate that can be made available for processor circuitry, rendering the approach expensive when compared to off-chip designs.

As discussed above, the number of states and tags required for a lower level cache in a non-inclusive hierarchical cache unit is much less than the number of tags and states required under the inclusive method. In a cache coherency protocol maintained under MOESI, three states per tag are required. Authors Paul Sweazey and Alan Jay Smith describe the MOESI protocol in *A Class of Compatible Cache Consistency Protocols and their Support by the IEEE futurebus*, IEEE, 1996, which disclosure is hereby incorporated by reference.

To further reduce the number of states per tag required to maintain coherency, third cache 32 is limited to holding read-only information and receiving write-invalidation snoop requests only in the present invention. This allows the number of states per tag to be reduced to a single bit, reducing the size of a directory 42 corresponding to third cache 32 and enabling directory 42 to be placed on-chip, further increasing the bandwidth of third cache 32 since directory 42 can be directly accessed by processor 22-1 without going through external cache bus 36.

Operating under read-only constraints precludes store operations directed to a cache line in third cache 32 from being serviced unless the requesting client such as processor 22-2 asks for permission first. For example, under a MOESI cache coherency protocol, if a processor has a cached copy in an "exclusive" state, the processor can safely read and write to the data copy without checking other caches for another data copy or informing other processors (in a multiprocessor system) because the data copy is exclusive. When a processor has a "read-only" copy, it means that there is a potential that more than one data copy of the same memory location is kept in other caches in the system.

In a multiprocessor system the write invalidations are sent using snoop requests to other processors. When a processor receives a snoop requesting a write invalidation, it removes the addressed data copy from its local cache, if one exists. Thus, the requesting processor procures the "permission" or the "ownership" for the accessed location, giving the processor an exclusive copy of the information in the system.

Limiting snoop requests to write invalidation requests minimizes snoop requests to third cache 32, increasing the amount of cache memory bandwidth available for servicing cache fetches from third cache 32. In the event that a cache hit occurs in third cache 32, the information found in third cache 32 must be transferred to second cache before a modification can be made to that information.

Method of Operation

Figure 3:
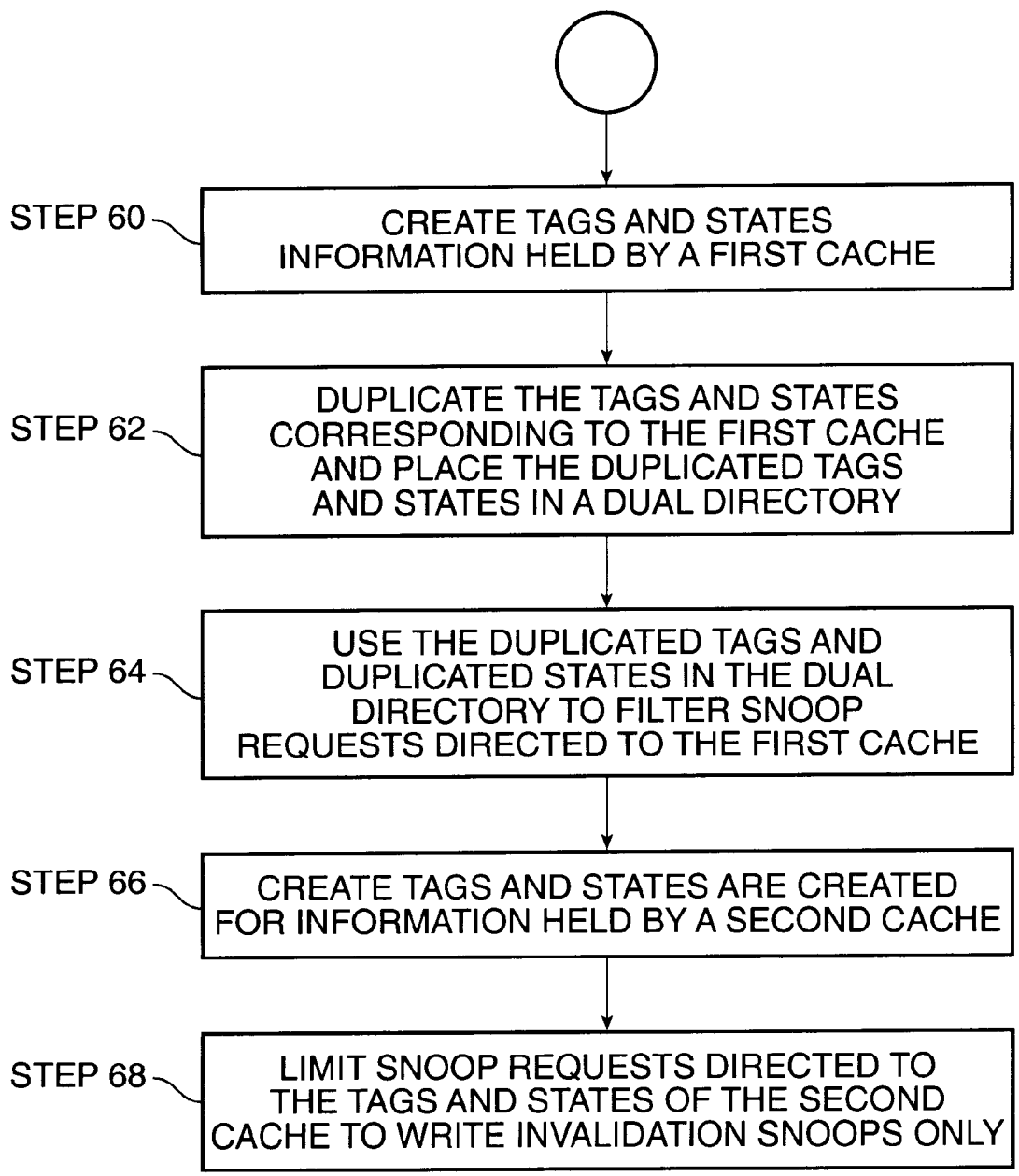
FIG. 3 shows a method of operation in accordance with a preferred embodiment of the present invention.

FIG. 3 shows a method of operation in accordance with a preferred embodiment of the present invention.

At step 60 tags and states corresponding to a first cache are created. For example, tags and states are created for information held by a level two cache. Also, the cache is defined to hold the information in a non-inclusive manner since the tags and states correspond to information that are not necessarily a superset of an upper level cache such as a level two cache.

At step 62, the tags and states corresponding to the first cache as described in step 60 are duplicated and placed in a dual directory.

At step 64, the duplicated tags and duplicated states are used to filter snoop requests directed to the first cache.

At step 66, tags and states are created for information held by a second cache. For example, tags and states may be created for information held by a level three cache such as an external cache. The level three external cache is defined to hold information in a non-inclusive manner.

At step 68, snoop requests directed to the tags and states of the second cache are limited to write invalidation snoops only.

In accordance with an alternative embodiment of the present invention the tags and states created for information held by the second cache in step 66 are stored in a directory which is held on-chip.

While embodiments and applications of this invention have been shown and described, it would be apparent to those skilled in the art that many more modifications than mentioned above are possible without departing from the inventive concepts herein. The invention therefore, is not to be restricted except in the spirit of the appended claims.

What is claimed is:

1. A method for optimizing a hierarchical cache memory system, comprising the steps of:
   creating tags and states corresponding to a first cache;
   creating duplicated tags and duplicated states by duplicating said tags and said states corresponding to said first cache;
   using said duplicated tags and said duplicated states to filter snoop requests directed to said first cache;
   creating tags and states corresponding to a second cache;
   filtering snoop requests directed to said second cache to write invalidation snoops only; and
   maintaining a non-inclusive cache procedure for said first cache and said second cache, wherein said first cache is at least one cache level above said second cache.

2. The method in claim 1, further including the step of storing said tags and states corresponding to said second cache on the same silicon real estate as a corresponding processor.

3. The method in claim 1, further including the step of limiting all cache operations to said second cache to read-only operations.

4. The method in claim 1, further including the step of creating tags and states corresponding to a third cache, wherein said third cache is at least one level above said first cache and at least two levels above said second cache in the hierarchical cache memory system.

5. The method in claim 1, further including a step of rendering said duplicated tags and said duplicated states corresponding to said first cache accessible by a system bus.

6. A method for optimizing a hierarchical cache memory system, comprising the steps of:
   creating tags and states corresponding to a first cache;
   creating tags and states corresponding to a second cache, said first cache being at least one cache level above said second cache;
   creating duplicated tags and duplicated states by duplicating said tags and said states corresponding to said second cache, said second cache being at least one cache level above a third cache;
   using said duplicated tags and said duplicated states to filter snoop requests directed to said second cache;
   creating tags and states corresponding to said third cache;
   filtering snoop requests directed to said third cache to write invalidation snoops only; and
   maintaining a non-inclusive cache procedure for said first cache, said second cache, and said third cache.

7. The method in claim 6, further including the step of rendering said duplicated tags and said duplicated states in said second cache accessible to snoop requests transmitted on a snoop bus.

8. The method in claim 6, further including the step of storing said tags and states corresponding to said second cache on the same silicon real estate as a corresponding processor.

9. The method in claim 6, further including the step of limiting all cache operations to said third cache to read-only operations.

10. A method for optimizing a hierarchical cache memory system, comprising the steps of:
    creating tags and states corresponding to a first cache;
    creating tags and states corresponding to a second cache, said first cache being at least one cache level above said second cache;
    creating duplicated tags and duplicated states by duplicating said tags and said states corresponding to said second cache, said second cache being least one cache level above a third cache;
    using said duplicated tags and said duplicated states to filter snoop requests directed to said second cache;
    creating tags and states corresponding to said third cache;
    filtering snoop requests directed to said third cache to write invalidation snoops only;
    maintaining a non-inclusive cache procedure for said first cache, said second cache, and said third cache; and
    storing said tags and states corresponding to said third cache on the same silicon real estate as a corresponding processor.

11. The method in claim 10, further including the step of limiting all cache operations to said third cache to read-only operations.

12. An apparatus for optimizing a hierarchical cache memory system, comprising:
    a first cache for storing information;
    tags and states corresponding to said information;
    a dual directory having duplicate tags and duplicates states which correspond to said information, said dual directory responsive to snoops;
    a second cache for storing information which is at least one level below said first cache, wherein said first cache and said second cache store said information in a non-inclusive manner; and
    a snoop queue responsive to snoops which includes responding to snoops directed to said second cache by filtering out said snoops directed to said second cache other than snoops for write-invalidation.

13. The apparatus of claim 12, further including a directory for holding tags and states corresponding to said information stored in second cache, said directory held on the same silicon real estates as a corresponding processor.

14. The apparatus of claim 12, where said second cache is limited to read-only transactions.

15. The apparatus of claim 12, further including:
    a third cache for storing information; and
    tags and states corresponding to said information stored in said third cache, wherein said third cache is at least one level above said first cache and at least two levels above said second cache.

16. The method in claim 12, further including a system bus, said system bus for sending snoops to said first cache, said second cache, and said third cache.

17. An apparatus for optimizing a hierarchical cache memory system, comprising:
    tags and states corresponding to a first cache;
    tags and states corresponding to a second cache, said first cache being at least one cache level above said second cache;
    duplicate tags and duplicate states that are copies of said tags and said states corresponding to said second cache, said second cache being at least one cache level above a third cache, said duplicate tags and said duplicate states used to filter snoop requests directed to said second cache;
    tags and states corresponding to said third cache;
    a snoop queue responsive to snoops directed to said third cache, said snoop queue limiting snoops to said third cache to write invalidation snoops only; and
    wherein a non-inclusive cache procedure is maintained for said first cache, said second cache, and said third cache.

18. The apparatus in claim 17, further including a system bus, said system bus for sending snoops to said first cache, said second cache, and said third cache.

19. The apparatus of claim 17, further including a directory for holding said tags and state corresponding to said information stored in said third cache, said directory held on the same silicon real estates as a corresponding processor.

20. The apparatus of claim 17, where said third cache is limited to read-only transactions.

21. An apparatus for optimizing a hierarchical cache memory system, comprising:

tags and states corresponding to a first cache;

tags and states corresponding to a second cache, said first cache is at least one cache level above said second cache;

duplicate tags and duplicate states that are copies of said tags and said states corresponding to said second cache, said second cache at least one cache level above a third cache, said duplicate tags and said duplicate states used to filter snoop requests directed to said second cache;

tags and states corresponding to said third cache;

a snoop queue responsive to snoops directed to said third cache, said snoop queue limiting snoops to said third cache to write invalidation snoops only;

wherein a non-inclusive cache procedure is maintained for said first cache, said second cache, and said third cache; and a directory for holding tags and states corresponding to said information stored in said third cache, said directory held on the same silicon real estate as a corresponding processor.

22. The apparatus of claim 21, where said third cache is limited to read-only transactions.

23. A method for providing a computer system, comprising the steps of:

providing a non-inclusive hierarchical cache memory system including:

a first cache for storing information;

tags and states corresponding to said information;

a dual directory having duplicate tags and duplicates states which correspond to said information, said dual directory responsive to snoops;

a second cache for storing information which is at least one level below said first cache, wherein said first cache and said second cache store said information in a non-inclusive manner; and a snoop queue responsive to snoops which includes responding to snoops directed to said second cache by filtering out said snoops directed to said second cache other than snoops for write-invalidation.

24. The apparatus of claim 23, wherein said first cache and said second cache store said information in a non-inclusive manner.

* * * * *

UNITED STATES PATENT AND TRADEMARK OFFICE
CERTIFICATE OF CORRECTION

PATENT NO: 6,073,212
DATED: June 6, 2000
INVENTORS: Norman M. Hayes, Belliappa M. Kuttanna, Krishna M. Thatipelli, Ricky C. Hetherington and Fong Pong It is certified that error appears in the above-identified patent and that said Letter Patent are hereby corrected as shown below:

In column 9 line 5, delete "state" and insert - - states- -

In column 9 line 7, delete "estates" and insert - -estate- -.

Signed and Sealed this

Seventeenth Day of April, 2001

*Attest:*

NICHOLAS P. GODICI

*Attesting Officer*       Acting Director of the United States Patent and Trademark Office